United States Patent
Takeuchi

(10) Patent No.: US 9,563,103 B2
(45) Date of Patent: Feb. 7, 2017

(54) IMAGE STABILIZATION APPARATUS AND METHOD OF CONTROLLING IMAGE STABILIZATION APPARATUS

(71) Applicant: CANON KABUSHIKI KAISHA, Tokyo (JP)

(72) Inventor: Kenji Takeuchi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 21 days.

(21) Appl. No.: 14/821,021

(22) Filed: Aug. 7, 2015

(65) Prior Publication Data

US 2016/0054642 A1   Feb. 25, 2016

(30) Foreign Application Priority Data

Aug. 19, 2014  (JP) .................................. 2014-166998
May 19, 2015  (JP) .................................. 2015-102276

(51) Int. Cl.
*G03B 5/00*   (2006.01)
*G03B 5/02*   (2006.01)

(52) U.S. Cl.
CPC ......... *G03B 5/02* (2013.01); *G03B 2205/0015* (2013.01); *G03B 2217/005* (2013.01)

(58) Field of Classification Search
CPC ...... G02B 27/646; H04N 5/23287; G03B 5/00
USPC ........................................ 396/55; 348/208.11
See application file for complete search history.

(56) References Cited

U.S. PATENT DOCUMENTS

| | | | |
|---|---|---|---|
| 2006/0268431 A1* | 11/2006 | Jin ....................... | G02B 27/646 359/726 |
| 2008/0129831 A1* | 6/2008 | Cho .................... | G02B 27/646 348/208.16 |
| 2009/0262425 A1* | 10/2009 | Kimura ................... | G03B 5/00 359/557 |
| 2009/0263116 A1* | 10/2009 | Saito .................... | G02B 27/646 396/55 |
| 2014/0211030 A1* | 7/2014 | Hideshima ............... | G03B 5/00 348/208.11 |

FOREIGN PATENT DOCUMENTS

JP   2001-249276 A   9/2001

* cited by examiner

*Primary Examiner* — Rochelle-Ann J Blackman
(74) *Attorney, Agent, or Firm* — Cowan, Liebowitz & Latman, P.C.

(57) ABSTRACT

An image stabilization apparatus comprises: a first optical correction unit; a second optical correction unit that is arranged at a position different from the first optical correction unit in an optical axis direction of the first optical correction unit; and a control unit configured to execute a first control mode in which camera shake is optically corrected by shifting the first optical correction unit in a direction that is different from an optical axis based on a camera shake correction signal calculated from output from a camera shake detection unit, and in which the second optical correction unit is shifted in a direction different from the optical axis to correct aberration that occurs due to shifting the first optical correction unit in a direction different from the optical axis.

18 Claims, 11 Drawing Sheets

FIRST CONTROL MODE

SECOND CONTROL MODE

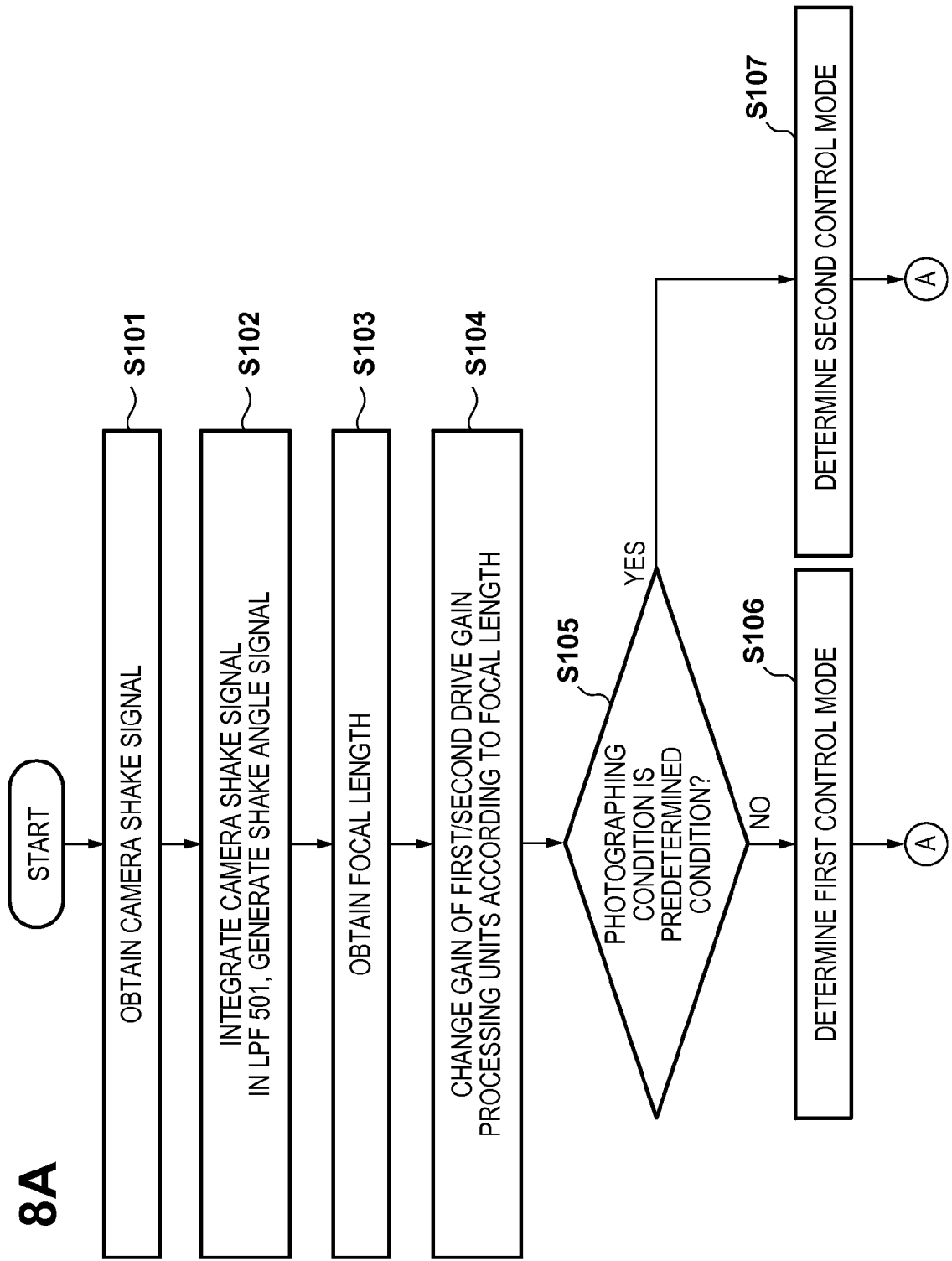
F I G. 8A

FIG. 9

| | FIRST CONTROL MODE | SECOND CONTROL MODE |
|---|---|---|
| SYNCHRONIZED DRIVING OF TWO LENSES | SYNCHRONIZE | DO NOT SYNCHRONIZE |
| PROPERTY PRIORITY | PRIORITIZE OPTICAL PROPERTIES | PRIORITIZE CAMERA SHAKE CORRECTION PROPERTIES |
| FOCAL LENGTH | SHORT | LONG |
| AMOUNT OF CAMERA SHAKE | SMALL | LARGE |
| SHOOTING DIRECTION CHANGE | STILL | PANNING |
| SHOOTING MODE | MOVING IMAGE SHOOTING | STILL IMAGE SHOOTING |
| STILL IMAGE SHOOTING STATE | SHOOTING STAND-BY | DURING EXPOSURE |
| CAMERA SHAKE CORRECTION MODE | CAMERA SHAKE CORRECTION STOPPED | |
| FIRST CAMERA SHAKE CORRECTION LENS STATE | | MALFUNCTION |

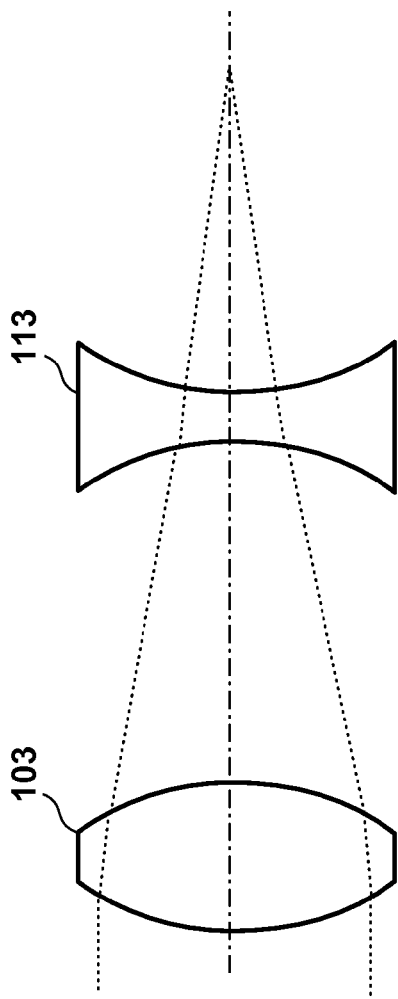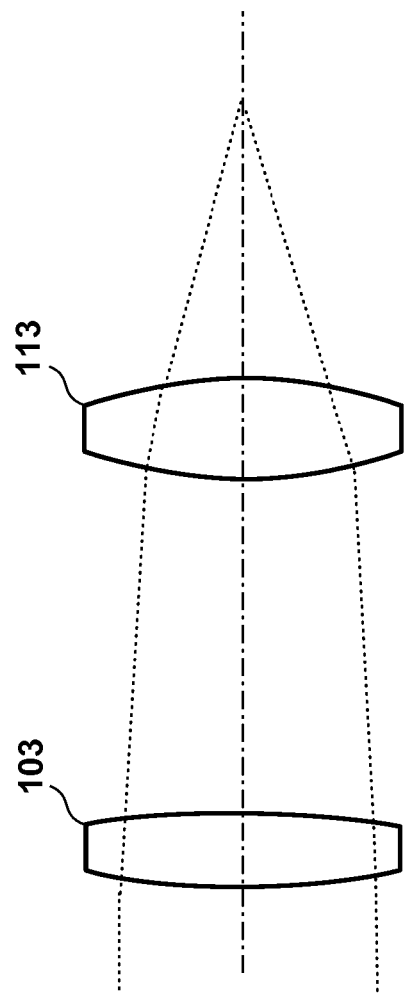

IMAGE STABILIZATION APPARATUS AND METHOD OF CONTROLLING IMAGE STABILIZATION APPARATUS

BACKGROUND OF THE INVENTION

Field of the Invention

The present invention relates to an image stabilization apparatus and a method of controlling an image stabilization apparatus.

Description of the Related Art

There are cases where camera shake brought on by movement of the hands of a user holding a camera body leads to blurring (camera shake) of a subject when shooting an image with an image capturing apparatus such as a digital camera, and an image capturing apparatus that includes an image stabilization system that corrects camera shake has been proposed.

Conventionally, an optical image stabilization process or an electrical image stabilization process has been used as the correction process by the image stabilization system. In a general optical image stabilization process, vibrations applied to a camera body are detected by an angular velocity sensor or the like, and a camera shake correction lens that is provided in an imaging optical system is shifted in a direction perpendicular to the optical axis in accordance with the detection results. Accordingly, the camera shake is corrected by shifting the path of the entering light so as to shift the image that has formed on a light receiving surface of an image sensor. On the other hand, in a general electrical image stabilization process, the camera shake is virtually corrected by changing a cut-out range of the captured image.

As an imaging lens that includes a conventional camera shake correction unit, Japanese Patent Laid-Open No. 2001-249276 proposes an imaging lens that corrects camera shake by shifting multiple correction lenses in a direction that is different from an optical axis.

It is disclosed in Japanese Patent Laid-Open No. 2001-249276 that, in the imaging lens that has an image stabilization function, either a correction lens group that is made up of multiple correction lenses is shifted integrally in a direction that is different from the optical axis direction, or the correction lens group is integrally rotated with the vicinity of the center of gravity of the stabilization lens group as the center. Accordingly, in comparison to the case where image stabilization is performed with a single correction lens, the shifting amount of an image with respect to the driving amount of the stabilization lens group is increased, and the deterioration of optical properties (mainly eccentric aberration) that occurs when the correction lens group is shifted is suppressed to a low level. Also, it is disclosed that an increase in size of the apparatus is suppressed by using the same drive mechanism to integrally perform driving of the stabilization lens group.

However, in the case where the stabilization lens group is integrally driven by the same driving apparatus as in Japanese Patent Laid-Open No. 2001-249276, the lenses are always driven in synchronization, and therefore in scenes with large camera shake such as moving image shooting while walking, the multiple lenses simultaneously reach the limit of the scope in which camera shake correction is possible. Accordingly, there is a possibility of deterioration in image stabilization performance.

SUMMARY OF THE INVENTION

The present invention has been made in consideration of the above situation, and realizes favorable image stabilization while suppressing the deterioration of optical properties such as mainly astigmatism and field curvature.

According to the present invention, provided is an image stabilization apparatus comprising: a first optical correction unit; a second optical correction unit that is arranged at a position different from the first optical correction unit in an optical axis direction of the first optical correction unit; and a control unit configured to execute a first control mode in which camera shake is optically corrected by shifting the first optical correction unit in a direction that is different from an optical axis based on a camera shake correction signal calculated from output from a camera shake detection unit, and in which the second optical correction unit is shifted in a direction different from the optical axis to correct aberration that occurs due to shifting the first optical correction unit in a direction different from the optical axis.

According to the present invention, provided is a method of controlling an image stabilization apparatus that has a first optical correction unit and a second optical correction unit arranged at a position different from the first optical correction unit in an optical axis direction of the first optical correction unit, the method comprising: a first correction step of optically correcting camera shake by shifting the first optical correction unit in a direction different from an optical axis based on a camera shake correction signal calculated from output from a camera shake detection unit; and a second correction step of shifting the second optical correction unit in a direction different from the optical axis to correct aberration that occurs due to shifting of the first optical correction unit in a direction different from the optical axis.

Further features of the present invention will become apparent from the following description of exemplary embodiments (with reference to the attached drawings).

BRIEF DESCRIPTION OF THE DRAWINGS

The accompanying drawings, which are incorporated in and constitute a portion of the specification, illustrate embodiments of the invention, and together with the description, serve to explain the principles of the invention.

FIGS. 8A and 8B are flowcharts for describing target position calculation process of the camera shake correction lens according to the embodiment;

FIG. 9 is a diagram showing characteristics of the first control mode and the second control mode and a relation according to an image shooting condition according to the embodiment; and FIGS. 10A and 10B are diagrams showing a power polarity relationship of the first camera shake correction lens and the second camera shake correction lens according to the embodiment.

DESCRIPTION OF THE EMBODIMENTS

Exemplary embodiments of the present invention will be described in detail in accordance with the accompanying drawings.

Figure 1:
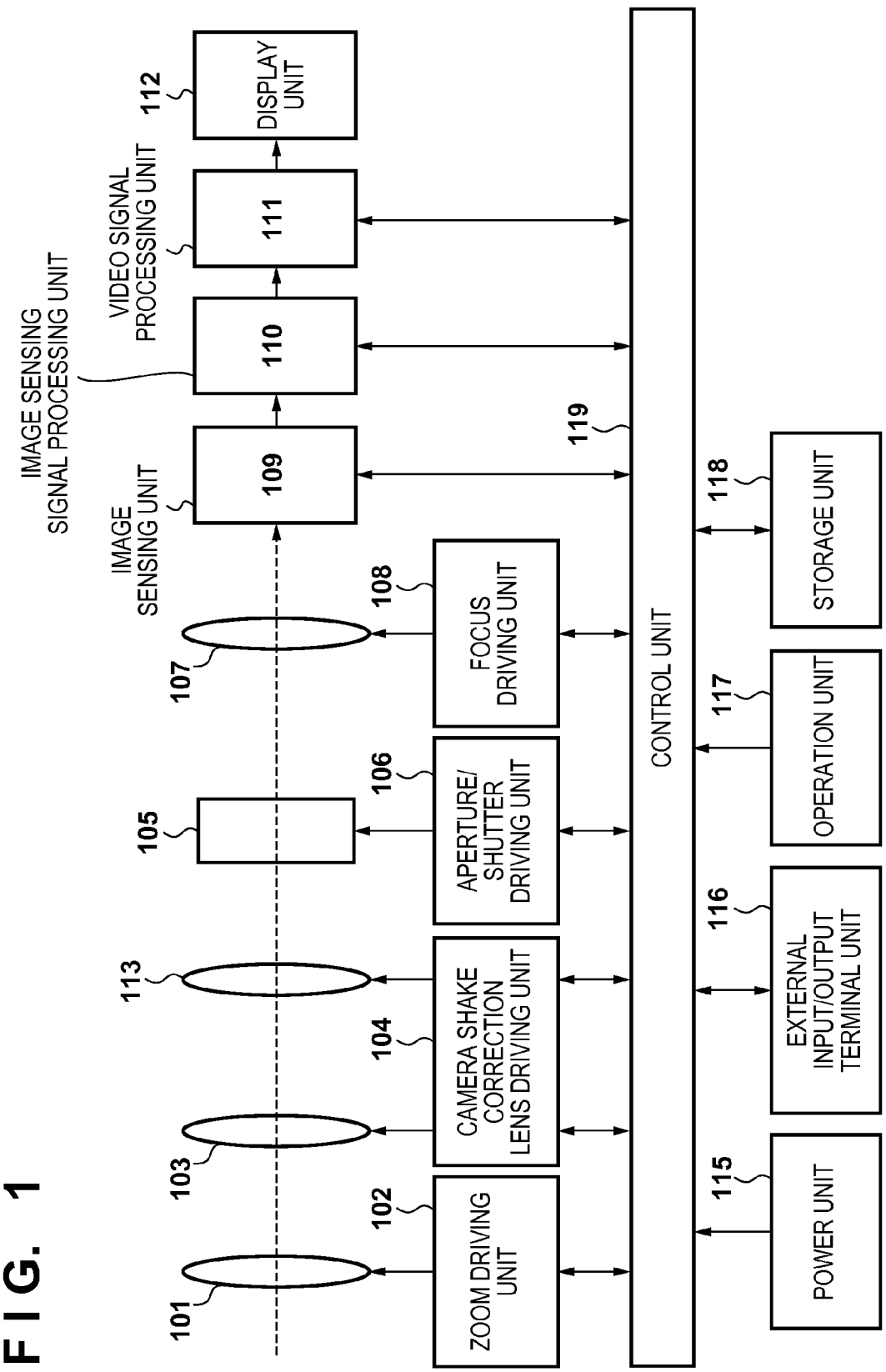
FIG. 1 is a block diagram showing a schematic configuration of an image capturing apparatus according to an embodiment of the present invention.

FIG. 1 is a block diagram showing a schematic configuration of an image capturing apparatus according to an embodiment of the present invention. In the present embodiment, a digital camera is described as being an example of the image capturing apparatus. Note that the image capturing apparatus of the present embodiment may include a moving image shooting function.

In FIG. 1, a zoom lens 101 constitutes an imaging optical system, and a zoom driving unit 102 controls driving of the zoom lens 101 in the optical axis direction of the imaging optical system in accordance with control performed by a control unit 119, thereby the focal length is changed. A first camera shake correction lens 103 is a correction member that corrects camera shake, is configured to be able to shift in a direction orthogonal to the optical axis of the imaging optical system, and is subjected to drive control by a camera shake correction lens driving unit 104. A second camera shake correction lens 113 has the same configuration as the first camera shake correction lens 103, and optically corrects camera shake by being subjected to drive control by the camera shake correction lens driving unit 104.

An aperture/shutter unit 105 is a mechanical shutter that has an aperture function, and an aperture/shutter driving unit 106 drives the aperture/shutter unit 105 in accordance with control performed by a control unit 119. A focus lens 107 constitutes an imaging optical system, and is configured to be able to move forward and backward in the optical axis direction of the imaging optical system. A focus driving unit 108 drives the focus lens 107 in accordance with control by the control unit 119.

An image sensing unit 109 converts an optical image of a subject incoming via the imaging optical system into an electrical signal using an image sensing element, such as a CCD image sensor or a CMOS image sensor. An image sensing signal processing unit 110 performs predetermined processes, such as A/D conversion, correlated double sampling, gamma correction, white balance correction, and color interpolation processing, on the electrical signal output from the image sensing unit 109, and converts it into a video signal. A video signal processing unit 111 manipulates the video signal output from the image sensing signal processing unit 110 in accordance with the application. Specifically, the video signal processing unit 111 performs generation of a video signal for display, encoding processing for recording, data file creation, or the like. A display unit 112 performs image display as necessary based on a video signal for display that is output from the video signal processing unit 111.

A power unit 115 supplies power to the entire image capturing apparatus according to the application. An external input/output terminal unit 116 performs the input and output of communication signals and video signals with an external apparatus. An operation unit 117 has buttons, switches, and the like for the user to give instructions to the image capturing apparatus, and includes a release button configured so that a first switch (SW1) and a second switch (SW2) are successively turned ON in accordance with the amount of pressing. If the release button is half pressed, the first switch SW1 is turned ON, and the first switch SW2 is turned on when the release button is pressed as far as it will go. A storage unit 118 stores various data including video signals.

The control unit 119 has a CPU, a ROM, and a RAM for example, and controls the units of the image capturing apparatus by deploying a control program stored in the ROM to the RAM, which is executed by the CPU, and the operations of the image capturing apparatus, including the various operations described below, are realized. Also, the control unit 119 performs AE processing that determines the shutter speed and the aperture value for obtaining a suitable light exposure based on the luminance information of the video signal and a predetermined program line chart.

When the first switch SW1 is turned ON, the control unit 119 calculates an AF evaluation value based on the video signal for display that is output by the video signal processing unit 111 to the display unit 112. Then automatic focus adjustment is performed by the control unit 119 controlling the focus driving unit 108 based on the AF evaluation value. Also, if the second switch SW2 included in the operation unit 117 is turned ON, the control unit 119 performs image shooting with a determined aperture and shutter speed, and the processing units are controlled so that the video signal that is obtained by processing the electrical signal read out from the image sensing unit 109 is stored in the storage unit 118.

Furthermore, the operation unit 117 has a camera shake correction switch with which the camera shake correction mode can be selected to be ON or OFF. When the camera shake correction mode is turned ON by the camera shake correction switch, a camera shake correction operation instruction is given to the camera shake correction lens driving unit 104 by the control unit 119, and the camera shake correction lens driving unit 104 that receives the instruction performs the camera shake correction operation until there is an instruction to turn OFF the camera shake correction operation. Also, the operation unit 117 has a shooting mode selection switch that allows for selection between a still image shooting mode and a moving image shooting mode. The control unit 119 can change the operating conditions of the camera shake correction lens driving unit 104 through selection of the shooting mode by operation of the shooting mode selection switch.

Also, the operation unit 117 has a playback mode selection switch for selecting a playback mode. When the playback mode is selected by operating the playback mode selection switch, the control unit 119 stops the camera shake correction operation. Also, a magnification change switch that performs instruction of the change in the zoom magnification is included in the operation unit 117. When an instruction is made by operating the magnification change switch to change the zoom magnification, the zoom driving unit 102 that receives the instruction via the control unit 119 drives the zoom lens 101, and the zoom lens 101 is shifted to an instructed zoom position.

Figure 2:
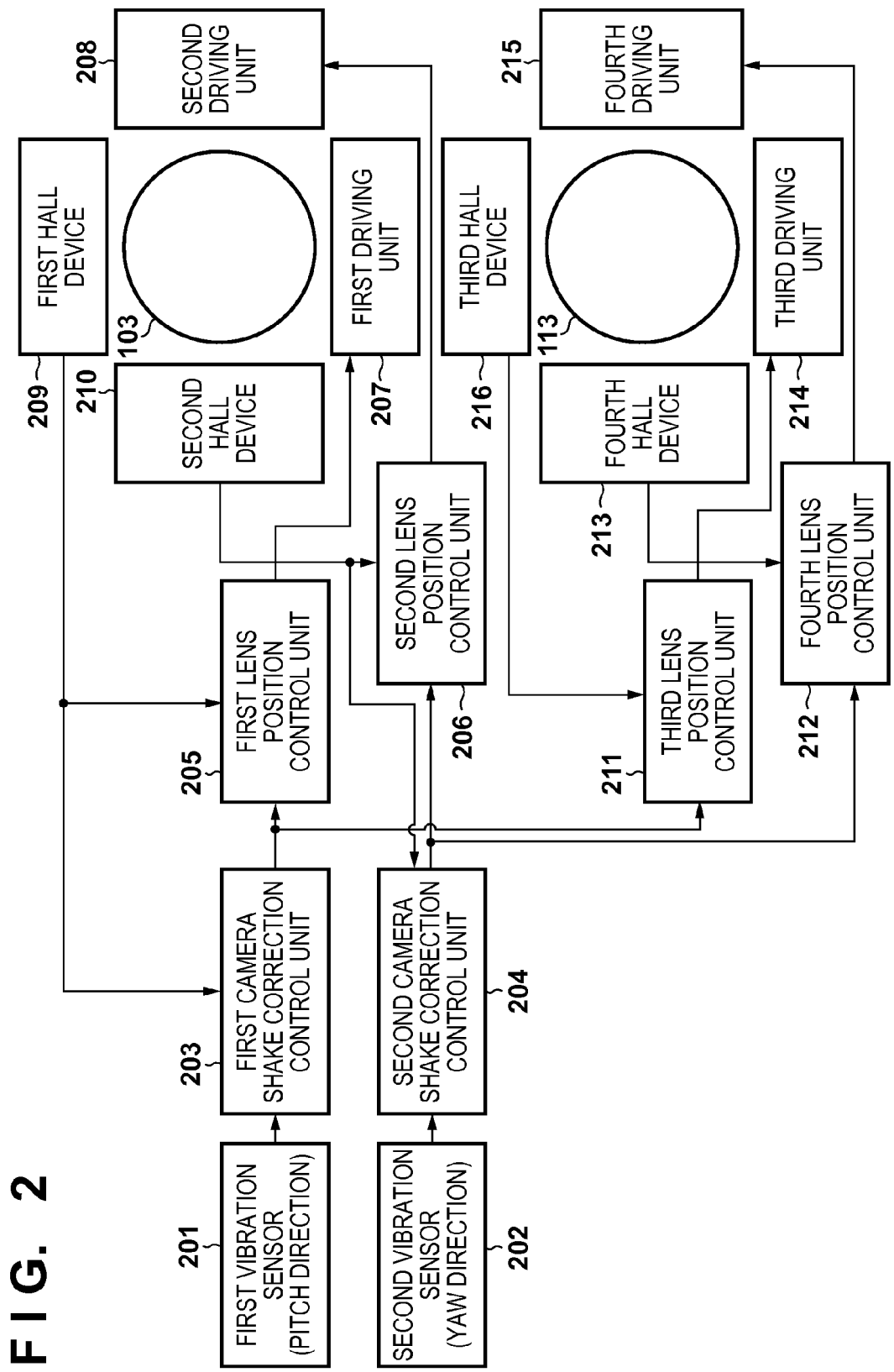
FIG. 2 is a block diagram showing a configuration of an image stabilization apparatus according to the embodiment.

FIG. 2 is a block diagram showing a detailed configuration of the first camera shake correction lens 103, the second camera shake correction lens 113, and the camera shake correction lens driving unit 104. Note that in FIG. 2, the configurations other than the first camera shake correction lens 103 and the second camera shake correction lens 113 configure the camera shake correction lens driving unit 104. The image stabilization apparatus in the present embodiment is configured by the first camera shake correction lens 103, the second camera shake correction lens 113, the camera shake correction lens driving unit 104, and the control unit 119 that controls the camera shake correction lens driving unit 104.

Given first is a description of the drive control of the first camera shake correction lens 103 by the camera shake correction lens driving unit 104, with reference to FIG. 2. A first vibration sensor 201 is an angular velocity sensor for example, and detects vibration in the vertical direction (the pitch direction) of the image capturing apparatus that is in the normal orientation (a position in which the length direction of the image approximately matches the horizontal direction), and outputs a camera shake signal (an angular velocity signal) that indicates the detected vibration. A first camera shake correction control unit 203 generates a correction position control signal to shift the position of the first camera shake correction lens 103, based on the shake signal output by the first vibration sensor 201, in the pitch direction so as to cancel out the image shake of the subject image, and the first camera shake correction control unit 203 outputs this correction position control signal to the first lens position control unit 205. Note that processing in the first camera shake correction control unit 203 is described in detail further on.

A second vibration sensor 202 is, for example, an angular velocity sensor that detects vibration in the horizontal direction (the yaw direction) of the image capturing apparatus in the above-described normal orientation, and outputs a camera shake signal (an angular velocity signal) indicating the detected vibration. Based on the camera shake signal output from the second vibration sensor 202, a second camera shake correction control unit 204 generates a correction position control signal for shifting the position of the first camera shake correction lens 103 in the yaw direction so as to cancel out the image shake, and outputs it to a second lens position control unit 206.

Note that the first camera shake correction control unit 203 and the second camera shake correction control unit 204 generate a correction position control signal by performing integration processes such as filter processing on the camera shake information (the angular velocity signal).

Also, a first hall device 209 generates a signal that has a voltage in accordance with the strength of the magnetic field generated by a magnet provided in the first camera shake correction lens 103, and outputs the signal as the position information in the pitch direction of the first camera shake correction lens 103. The first lens position control unit 205 performs feedback control based on the pitch direction correction position control signal that is supplied from the first camera shake correction control unit 203, and the pitch direction position information of the first camera shake correction lens 103 that is supplied from the first hall device 209. Specifically, a signal value from the first hall device 209 is compared with a correction position control signal value from the first camera shake correction control unit 203, and feedback control is performed while driving a first driving unit 207 such as an actuator such that the deviation converges to zero. In this way, the driving of the first camera shake correction lens 103 in the pitch direction is controlled.

Also, a second hall device 210 generates a signal that has a voltage in accordance with the strength of the magnetic field generated by the magnet that is provided in the first camera shake correction lens 103, and outputs the signal as the position information of the first camera shake correction lens 103 in the yaw direction. The second lens position control unit 206 performs feedback control based on the yaw direction correction position control signal that is supplied from the second camera shake correction control unit 204, and the yaw direction position information of the first camera shake correction lens 103 that is supplied from the second hall device 210. Specifically, a signal value from the second hall device 210 is compared with a correction position control signal value from the second camera shake correction control unit 204, and feedback control is performed while driving a second driving unit 208 such as an actuator such that the deviation converges to zero. In this way, the driving of the first camera shake correction lens 103 in the yaw direction is controlled.

Note that there is variation in the position signal values that are output from the first hall device 209 and the second hall device 210, and therefore output from the first and second hall devices 209 and 210 are adjusted so that the first camera shake correction lens 103 shifts to a predetermined position relative to a predetermined correction position control signal.

Given next is a description of the driving control operations of the second camera shake correction lens 113 by the camera shake correction lens driving unit 104.

The first camera shake correction control unit 203 generates a correction position control signal that drives the second camera shake correction lens 113 in the pitch direction based on the shake signal supplied from the first vibration sensor 201 and the pitch direction position information of the first camera shake correction lens 103 that is supplied from the first hall device 209. Then, the generated pitch direction correction position control signal is output to a third lens position control unit 211. The third lens position control unit 211 compares the pitch direction correction position control signal value that is supplied from the first camera shake correction control unit 203 and the signal value of the pitch direction position information of the second camera shake correction lens 113 that is supplied from a third hall device 216, and performs feedback control while driving a third drive unit 214 such that the deviation converges to zero.

Also, the second camera shake correction control unit 204 generates a correction position control signal that drives the second camera shake correction lens 113 in the yaw direction based on the camera shake signal that is supplied from the second vibration sensor 202 and the yaw direction position information of the first camera shake correction lens 103 that is supplied from the second hall device 210. Then, the yaw direction correction position control signal is output to a fourth lens position control unit 212. The fourth lens position control unit 212 compares the yaw direction correction position control signal value that is supplied from the second camera shake correction control unit 204 and the signal value of the yaw direction position information of the second camera shake correction lens 113 that is supplied from a fourth hall device 213, and performs feedback control while driving a fourth drive unit 215 such that the deviation converges to zero.

Figure 3:
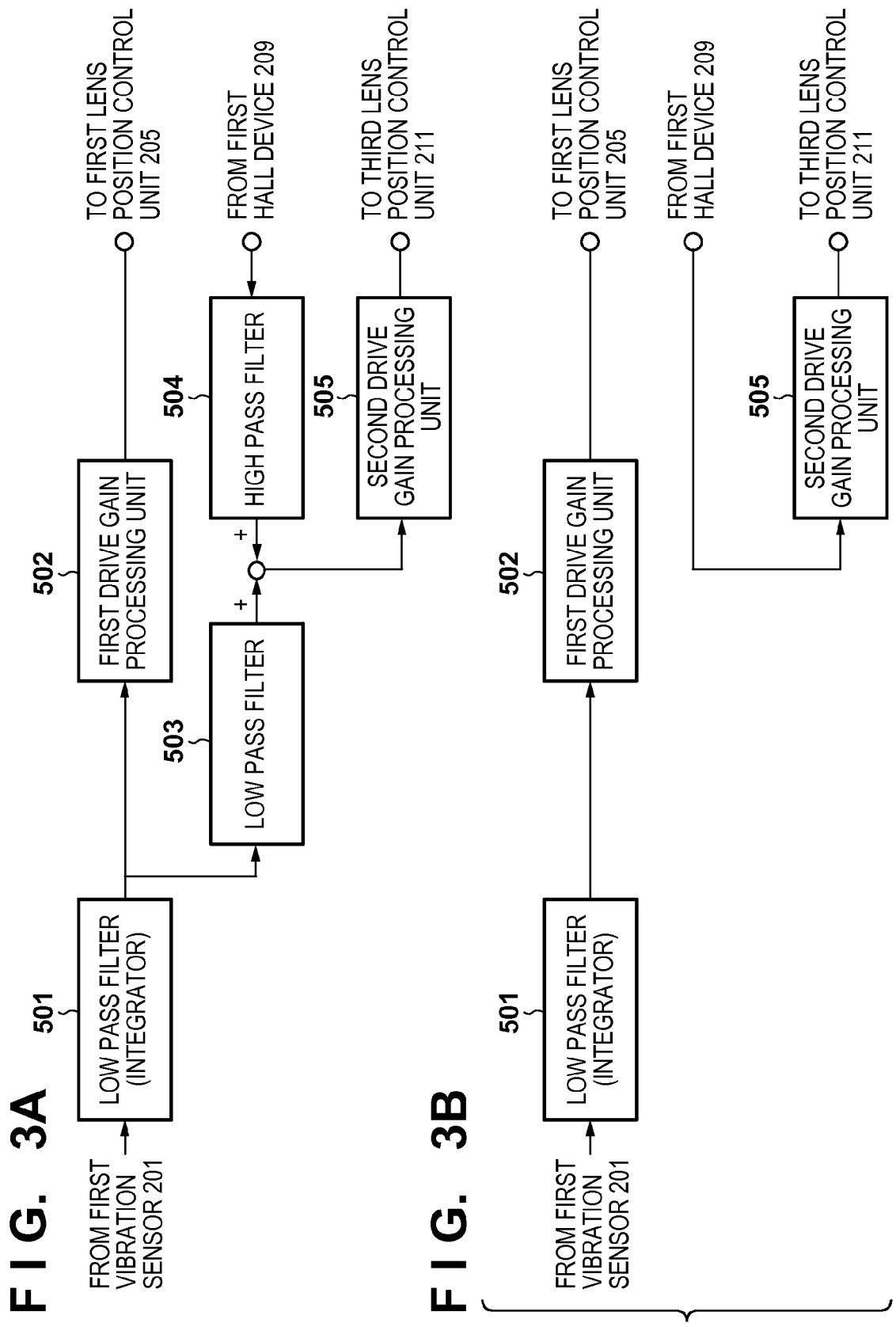
FIGS. 3A and 3B are block diagrams that show an example of an internal configuration of a first camera shake correction control unit according to the embodiment.

FIG. 3A is a diagram that shows an example of the configuration of the first camera shake correction control unit 203. The first camera shake correction control unit 203 according to the present embodiment includes a low pass filter (LPF) 501, a first drive gain processing unit 502, a low pass filter (LPF) 503, a high pass filter (HPF) 504, and a second drive gain processing unit 505. The following is a description of processing in the first camera shake correction control unit 203 with reference to FIG. 3A.

The camera shake signal (an angular velocity signal) detected by the first vibration sensor 201 undergoes integration processing by the LPF 501 of the first camera shake correction control unit 203, and the angular velocity signal is converted into an angle signal (hereinafter referred to as a "shake angle signal"). After the shake angle signal that is output from the LPF 501 is increased/decreased at a predetermined magnification by the first drive gain processing unit 502, the shake angle signal is output to the first lens position control unit 205 as a correction position control signal that indicates the pitch direction target position of the first camera shake correction lens 103.

On the other hand, a low-frequency component of the shake angle signal output from the LPF 501 is extracted by the LPF 503. Also, HPF 504 extracts a high-frequency component of the pitch direction position information of the first camera shake correction lens 103 detected by the first hall device 209. A signal in which the low-frequency component of the shake angle signal and the high-frequency component of the position information of the first camera shake correction lens 103 are totaled is obtained and increased or decreased with a predetermined magnification (gain) by the second drive gain processing unit 505. The signal that was decreased or increased by the second drive gain processing unit 505 is output to the third lens position control unit 211 as a correction position control signal that indicates a pitch direction target position of the second camera shake correction lens 113.

Note that in the above-described example, the signal in which the low-frequency component of the shake angle signal and the high-frequency component of the position of the first camera shake correction lens 103 are added together is the correction position control signal that indicates the target position of the second camera shake correction lens 113, but the present invention is not limited to this. For example, similar control can be applied even in a configuration in which the LPF 503 and the HPF 504 are replaced, and the signal in which the high-frequency component of the shake angle signal and the low-frequency component of the position of the first camera shake correction lens 103 are added together may be used as a signal indicating the target position of the second camera shake correction lens 113. In other words, it is sufficient that the low-frequency component is extracted from either the shake angle signal or the position of the first camera shake correction lens 103 by the LPF 503, the high-frequency component is extracted from the other by the HPF 504, and the two components are totaled.

Also, the second camera shake correction control unit 204 has a configuration that is similar to the first camera shake correction control unit 203, excluding the input source of signals for processing and the output destination of processed signals, and therefore the description has been omitted.

Figure 4:
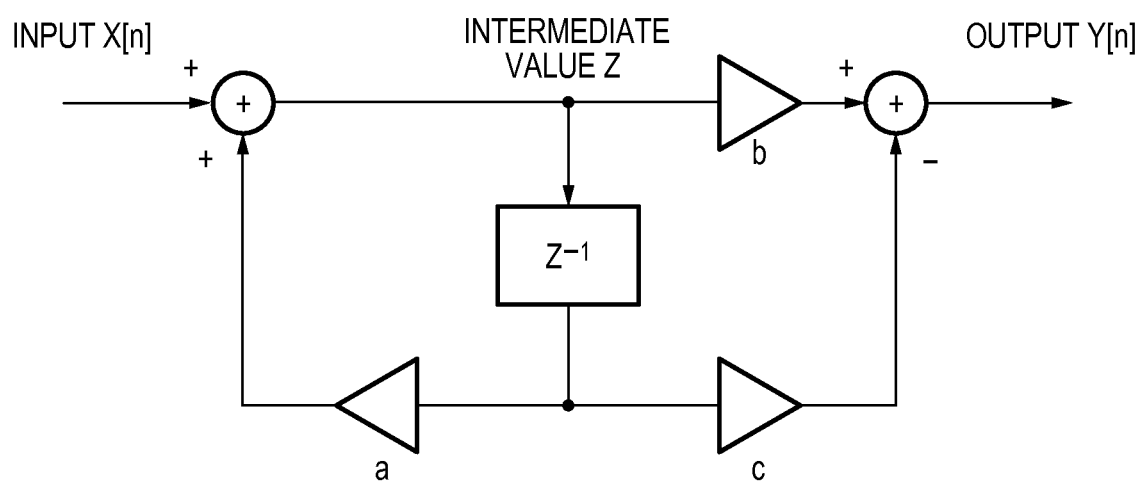
FIG. 4 is a diagram showing an example of a configuration of an LPF 503 and an HPF 504 of the first camera shake correction control unit according to the embodiment.

FIG. 4 is a diagram that shows an example of the configuration of the LPF 503 and the HPF 504, which are configured by a publicly known one dimensional IIR digital filter. Signals output from the digital filter can be increased or decreased with a predetermined magnification by changing coefficients b and c.

Also, FIG. 3B shows an example of the configuration example in which the LPF 503 and the HPF 504 of FIG. 3A are not used, and this is equivalent to the case where the cut off frequency of the LPF 503 and the HPF 504 is set to an exceedingly low frequency. The configuration shown in FIG. 3B may be used for the simplification of a circuit or software if it is a system that only switches whether or not the first camera shake correction lens 103 is to be driven in synchronization with the second camera shake correction lens 113.

Figure 5:
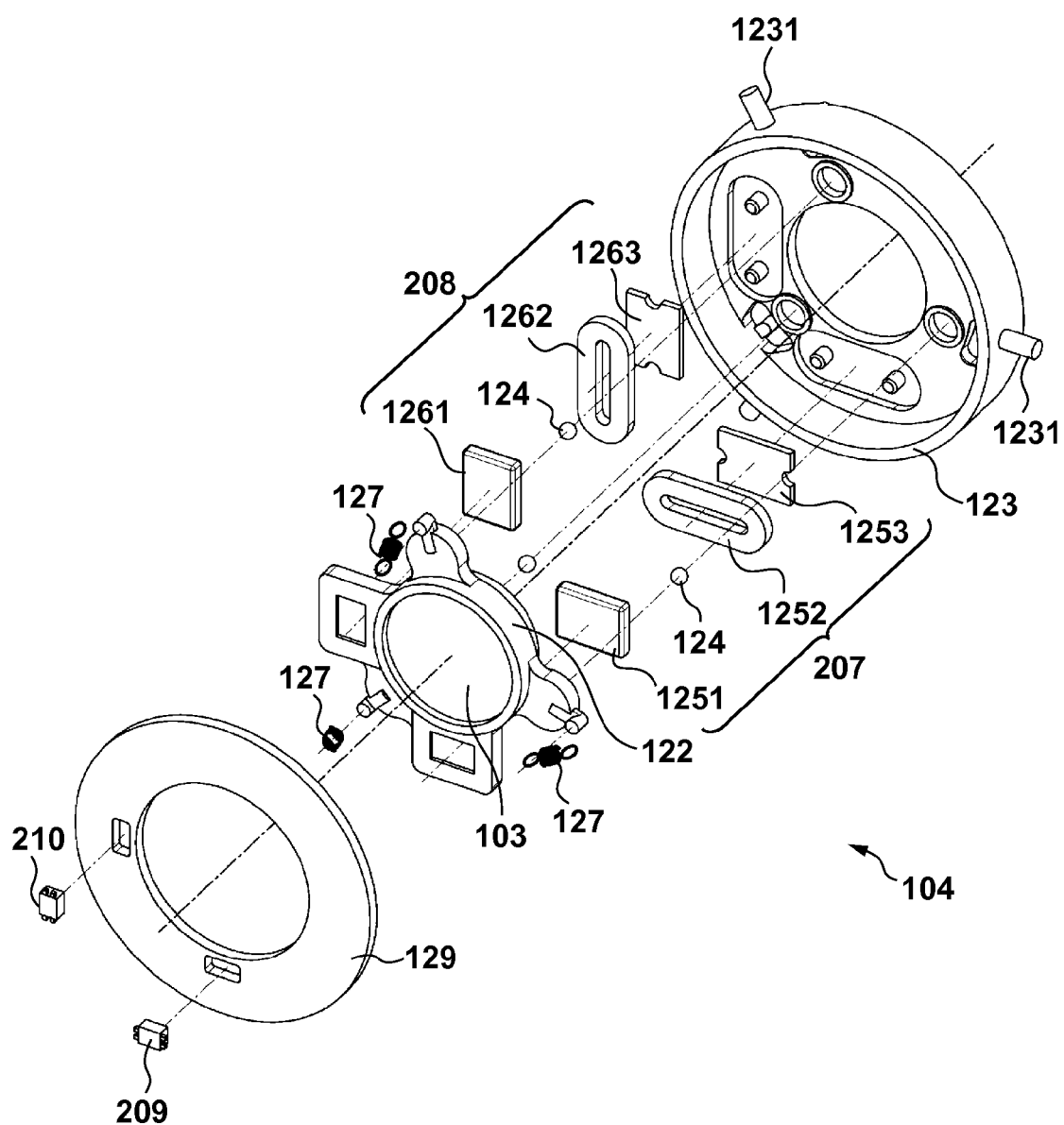
FIG. 5 is an exploded perspective view showing an example of a mechanical configuration of a camera shake correction lens driving unit.

FIG. 5 is an exploded perspective view showing a mechanical configuration example of the first camera shake correction lens 103 and the camera shake correction lens driving unit 104. In FIG. 5, a movable lens barrel 122 holds the first camera shake correction lens 103 at a central opening portion. The movable lens barrel 122 holds a first magnet 1251 and a second magnet 1261. Also, the movable lens barrel 122 includes three rolling ball receiver units, and is rollably supported by rolling balls 124 that allow shifting in a plane that is orthogonal to the optical axis. Also, the movable lens barrel 122 includes three spring peg units that each holds one end of a biasing spring 127.

A fixed ground plate 123 is formed into a cylindrical shape. The fixed ground plate 123 includes a follower 1231 at three places on an external circumferential portion, and the movable lens barrel 122 is arranged at a central opening portion. Accordingly, the amount of movability of the movable lens barrel 122 can be controlled. Also, the fixed ground plate 123 holds a first coil 1252 and a first yoke 1253 in a place that faces a magnetization surface of the first magnet 1251. Also, the fixed ground plate 123 holds a second coil 1262 and a second yoke 1263 in a place that faces a magnetization surface of the second magnet 1261. Furthermore, the fixed ground plate 123 includes three rolling ball receiver units, and the movable lens barrel 122 is supported via the rolling balls 124 that allow for shifting in a plane that is orthogonal to the optical axis. Also, the fixed ground plate 123 includes three spring peg units that each holds one end of the biasing spring 127.

The first driving unit 207, in this example, is a widely known voice coil motor that includes the first magnet 1251, the first coil 1252, and the first yoke 1253. A Lorentz force is generated between the first magnet 1251 that is fixed to the movable lens barrel 122 and the first coil 1252 by applying an electric current to the first coil 1252 that is attached to the fixed ground plate 123, and thus the movable lens barrel 122 can be driven. The second drive unit 208 includes the second magnet 1261, the second coil 1262, and the second yoke 1263, and a voice coil motor similar to that of the first drive unit 207 is arranged rotated 90°.

The biasing springs 127 are each a tension spring that generates biasing force in proportion to an amount of deformation. One end of the biasing spring 127 is fixed to the movable lens barrel 122, the other end is fixed to the fixed ground plate 123, and biasing force is generated between the two ends. The rolling balls 124 are sandwiched by this generated force, and the rolling balls 124 can keep the fixed ground plate 123 in a state of coming into contact with the movable lens barrel 122.

The first hall device 209 and the second hall device 210 are position sensors that use two magnetic sensors to read a magnetic flux of the first magnet 1251 and the second magnet 1261, and shift in a plane of the movable lens barrel 122 can be detected from the change in output.

A sensor holder 129 is configured as an approximately circular disk and is fixed to the fixed ground plate 123, and can hold the first hall device 209 and the second hall device 210 in a position that faces the first magnet 1251 and the second magnet 1261. Also, the sensor holder 129 can house the movable lens barrel 122 in the internal space formed along with the fixed ground plate 123. Accordingly, when there is an impact on the image stabilization apparatus, or even when there is a change in orientation difference, the falling-out of the internal units can be prevented. According to the above-described configuration, the camera shake correction lens driving unit 104 can shift the first camera shake correction lens 103 to any position on a plane orthogonal to the optical axis.

Figure 6:
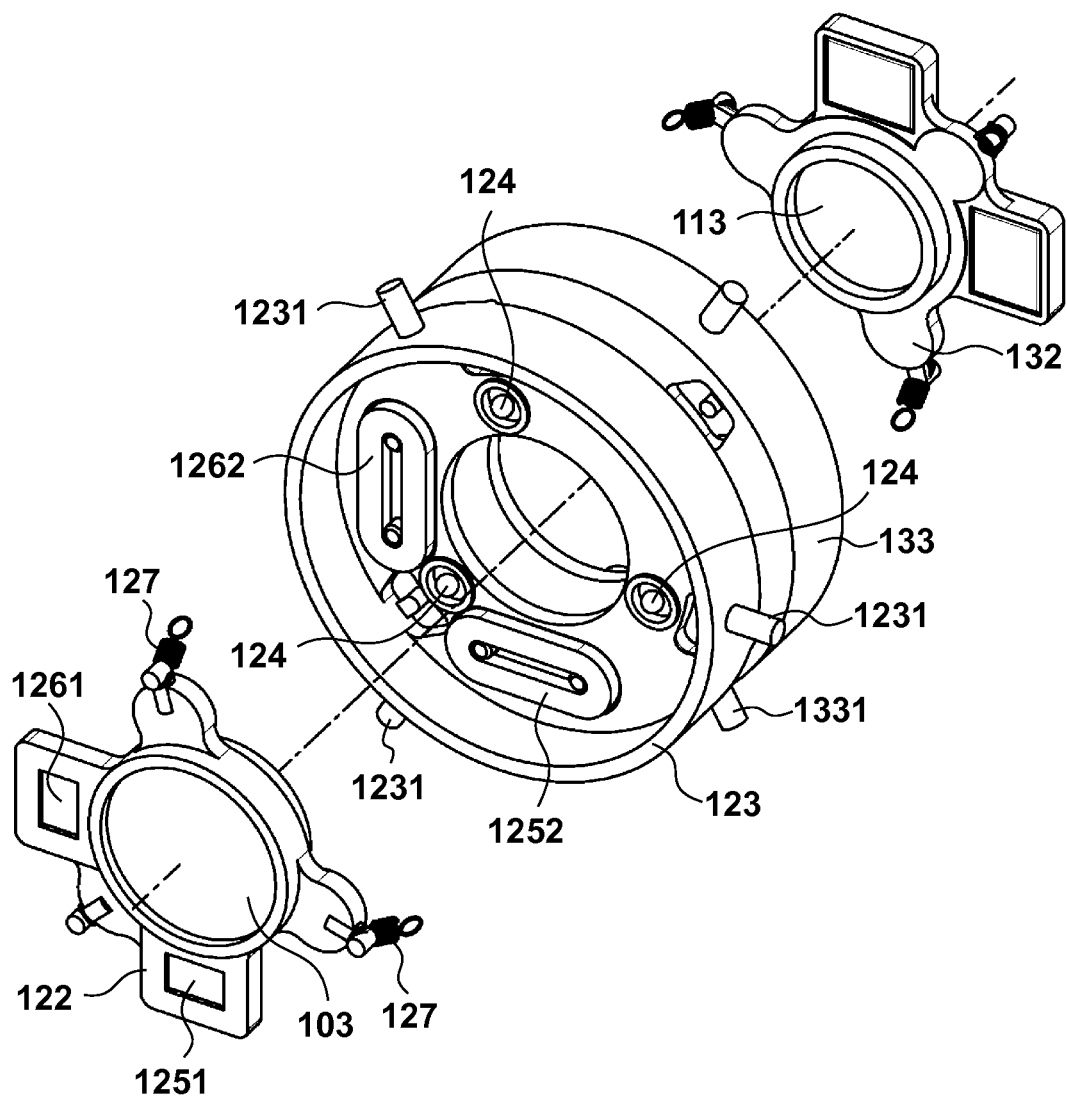
FIG. 6 is a perspective view showing a positional relation between a first camera shake correction lens and a second camera shake correction lens in the camera shake correction lens driving unit.

FIG. 6 is a diagram that shows the positional relation of the first camera shake correction lens 103 and the second camera shake correction lens 113 in the camera shake correction lens driving unit 104. In FIG. 6, a portion of the camera shake correction lens driving unit 104 is shown in an exploded view for the purpose of description. In FIG. 6, a movable lens barrel 132 holds the second camera shake correction lens 113 at the central opening portion. A movable lens barrel 132 is arranged at the central opening portion of a fixed ground plate 133. The camera shake correction lens driving unit 104 that includes the second camera shake correction lens 113 has a similar configuration to that of the camera shake correction lens driving unit 104 that includes the first camera shake correction lens 103, except for the shape of a lens and the shape of the movable lens barrel 132 that holds the lens, and therefore the detailed description will be omitted.

FIG. 10A and FIG. 10B are diagrams of a power polarity relationship of the first camera shake correction lens 103 and the second camera shake correction lens 113.

FIG. 10A is the case of configuration with a first camera shake correction lens 103 that has a positive power and the second camera shake correction lens 113 that has a negative power. In the present configuration, by shifting the first camera shake correction lens 103 with respect to the optical axis, image stabilization is performed, and by rotating the second camera shake correction lens 113 on the optical axis, or rotating centrally around a point that is in the vicinity of the optical axis, the eccentric aberration that occurs along with the driving of the first camera shake correction lens can be suppressed. Note that because the first camera shake correction lens 103 has a positive power and the second camera shake correction lens 113 has a negative power, a correctional effect on the eccentric aberration that accompanies camera shake correction is obtained by setting the driving direction of the lenses relative to the optical axis at this time to the same direction.

Also, in the present configuration, when the driving directions of the first camera shake correction lens 103 and the second camera shake correction lens 113 are set to mutually opposite directions with respect to the optical axis, the directions of change of the viewing angle of the captured image that accompany driving of the camera shake correction lenses become the same direction. For this reason, it is possible to reduce the driving amounts of the camera shake correction lenses for obtaining the same camera shake correction angle as in the case in which only one of the camera shake correction lenses is driven. Accordingly, even in the case where a big shake occurs, the camera shake correction lenses are suppressed from exceeding a drivable range, and favorable correction performance can be obtained.

FIG. 10B shows the case of configuration with the first camera shake correction lens 103 that has a positive power and the second camera shake correction lens 113 that has a positive power. In the present configuration, the polarity relation of the power is opposite to that shown in FIG. 10A, and therefore the driving directions of the two camera shake correction lenses are opposite to each other when performing eccentric aberration stabilization, and in the same direction in the case in which the shake correction angle is to be increased, thereby effects similar to those in FIG. 10A can be obtained.

Note that in the example shown in FIG. 10A, the power relationship of the first camera shake correction lens 103 and the second camera shake correction lens 113 is positive and negative, and in the example shown in FIG. 10B, the case of positive and positive is described, but the present invention is not limited to this. For example, the same effects can be achieved even in configurations of negative and negative or negative and positive relationships. Also, the case in which the first camera shake correction lens 103 is shifted with respect to the optical axis and the second camera shake correction lens 113 is rotationally tilted with respect to the optical axis or a point in the vicinity of the optical axis is described, but the present invention is not limited to this. Even in configurations in which the type of movement is tilt and shift or tilt and tilt, the same effects can be obtained.

As described above, the first camera shake correction lens 103 and the second camera shake correction lens 113 are subjected to drive control by the first camera shake correction control unit 203 and the second camera shake correction control unit 204. Accordingly, the camera shake correction operation that shifts the optical image that has passed through the imaging optical system is performed, and the stability of the image on the image capturing surface can be ensured.

In the present embodiment, the image stabilization apparatus that has the above configuration is selectively driven by two types of control modes, namely a first control mode and a second control mode.

Figure 7A:
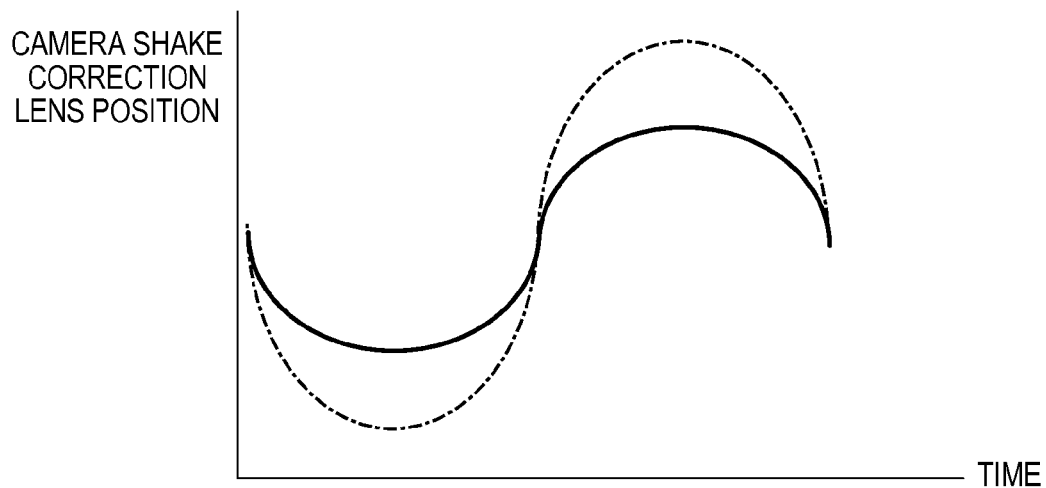
FIG. 7A is a diagram showing an example of positions of the camera shake correction lenses driven by a first control mode of the embodiment.

The first control mode drives the first camera shake correction lens 103 in synchronization with the second camera shake correction lens 113. An example of this driving is shown in FIG. 7A. In FIG. 7A, a solid line shows the position of the first camera shake correction lens 103 and a dotted line shows the position of the second camera shake correction lens 113. In the first control mode, the first camera shake correction lens 103 and the second camera shake correction lens 113 are driven at the same frequency and the same phase. Note that the driving amplitude does not necessarily need to match.

In order for the first camera shake correction lens 103 and the second camera shake correction lens 113 to be driven at the same frequency and the same phase in this way, in the first control mode, the cut off frequencies of the LPF 503 and the HPF 504 are set to the same extremely low frequency (for example, 0.01 Hz). Accordingly, the second camera shake correction lens 113 is driven so as to be compliant with the position signal of the first camera shake correction lens 103, and the two lenses are driven in synchronization at the same phase.

Figure 7B:
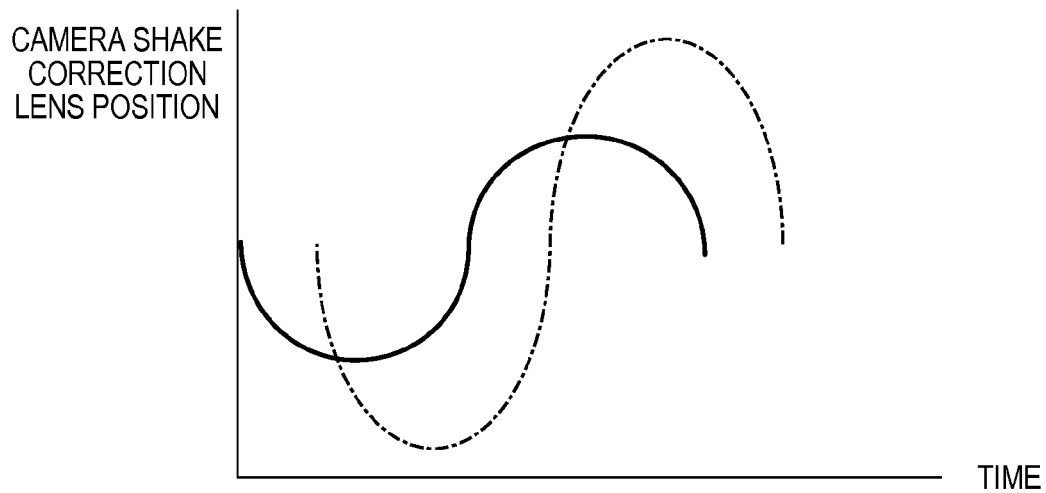
FIG. 7B is a diagram showing an example of positions of the camera shake correction lenses driven by a second control mode of the embodiment.

On the other hand, in the second control mode, the first camera shake correction lens 103 and the second camera shake correction lens 113 are driven without being in synchronization with one another. An example of this driving is shown in FIG. 7B. In FIG. 7B as well, the solid line shows the position of the first camera shake correction lens 103, and the dotted line shows the position of the second camera shake correction lens 113. In the second control mode, the frequency and the phase of the first camera shake correction lens 103 and the second camera shake correction lens 113 are independently controlled so as to independently drive the first camera shake correction lens 103 and the second camera shake correction lens 113.

In order for the first camera shake correction lens 103 and the second camera shake correction lens 113 to be driven independently in this way, in the second control mode, the cut off frequencies of the LPF 503 and the HPF 504 are set to the same high frequency. For example, it is sufficient to set the frequency at or higher than 1 Hz to 20 Hz, which is the general hand shake frequency band. Accordingly, the second camera shake correction lens 113 is driven so as to comply with the camera shake signal obtained by the LPF 503 and not the position signal for the first camera shake correction lens 103. Accordingly, the second camera shake correction lens 113 can be independently driven with no relationship with the position of the first camera shake correction lens 103 (in other words, driven without synchronization).

According to the above-described controls, the first control mode is a driving control that suppresses the deterioration of optical properties (mainly astigmatism, field curvature, etc.), and the second control mode is a driving control that prioritizes camera shake correction performance.

Note that in the configuration that does not include the LPF 503 and the HPF 504 shown in FIG. 3B, in order to realize driving control by the first driving mode, a second drive gain processing unit 505 is set to a value other than zero. In doing so, the second camera shake correction lens 113 can be driven in synchronization at the same phase so as to comply with the position signal of the first camera shake correction lens 103. On the other hand, by setting the gain value of the second drive gain processing unit 505 to zero the second camera shake correction lens 113 no longer receives an instruction regarding the target signal from the second drive gain processing unit 505. In this way, driving control by the second control mode can be realized by not driving the second camera shake correction lens 113 (the two camera shake correction lenses are not synchronized).

Figure 8B:
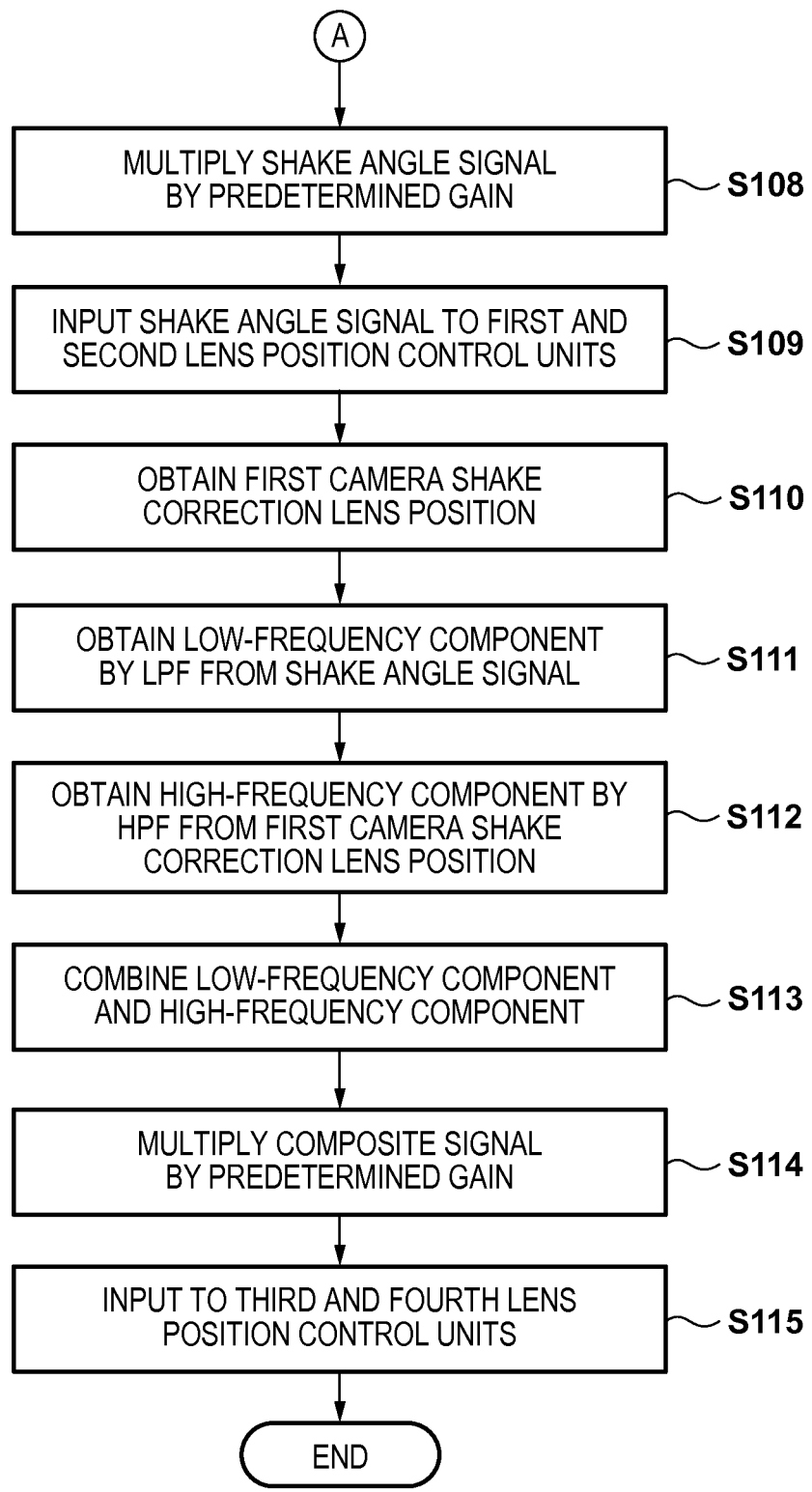

Next, target position calculation processing of the two camera shake correction lenses, namely the first camera shake correction lens 103 and the second camera shake correction lens 113, in the image stabilization apparatus that has the aforementioned configuration is described with reference to the flowcharts in FIGS. 8A and 8B. Note that the target position calculation processing is executed at constant cyclical intervals.

First, when processing starts, the first vibration sensor 201 and the second vibration sensor 202 each obtain camera shake signals (step S101). Next, in step S102, the LFPs 501 of the first camera shake correction control unit 203 and the second camera shake correction control unit 204 convert the obtained camera shake signals into shake angle information by integrating them.

Next, in step S103, focal length information is obtained from the zoom driving unit 102. Then, in step S104, the gains that are used in the first drive gain processing unit 502 and the second drive gain processing unit 505 are changed in accordance with the focal length indicated by the obtained focal length information. This processing is for correcting a difference in sensitivity (the amount of change in the angle of view relative to the driving distance of the camera shake correction lens) of the first camera shake correction lens 103 and the second camera shake correction lens 113 at different focal lengths.

Next, in step S105, it is determined whether or not the image shooting condition is a predetermined condition. Note that a detailed description regarding the predetermined condition will be given later. In the case where the condition is not the predetermined condition, then the procedure moves to step S106, in which the first control mode is determined as the camera shake correction processing. Then, after the cut off frequency is changed by changing the filter coefficients b and c of the LPF 503 and the HPF 504 to predetermined values so as to drive in the first control mode, the procedure moves to step S108.

If it is determined in step S105 that the image shooting condition is the predetermined condition, the procedure moves to step S107, and the second control mode is determined as the camera shake correction processing. Then, after the cut off frequency is changed by changing the filter coefficients b and c of the LPF 503 and the HPF 504 to predetermined values so as to drive in the second control mode, the process moves to step S108.

In step S108, the gain that was changed in step S106 or step S107 is multiplied by the shake angle signal in the first drive gain processing unit 502. Next, the shake angle signal is output from the first camera shake correction control unit 203 to the first lens position control unit 205, and from the second camera shake correction control unit 204 to the second lens position control unit 206 (step S109). Accordingly, the first camera shake correction lens 103 is driven.

Next, in step S110, the pitch direction and yaw direction positions of the camera shake correction lens 103 are obtained by the first hall device 209 and the second hall device 210. Then, in step S111, the low-frequency component is extracted from the shake angle signal by the LPF 503 whose cut off frequency was set in step S106 or step S107. Next, in step S112, the high-frequency component is extracted from the position of the first camera shake correction lens 103 by the HPF 504 whose cut off frequency was set in step S106 or step S107. In step S113, the low-frequency component extracted from the shake angle signal and the high-frequency component extracted from the first camera shake correction lens 103 position are composited, and in step S114, the gain that was changed in step S104 is multiplied by the composite signal. Afterwards, the multiplied composite signal is output from the first camera shake correction control unit 203 to the third lens position control unit 211, and from the second camera shake correction control unit 204 to the fourth lens position control unit 212 (step S115). Accordingly, the second camera shake correction lens 113 is driven by the first or second control mode.

FIG. 9 is a diagram showing characteristics of the first control mode and the second control mode and a relation according to an image shooting condition according to the embodiment. As described above, the first control mode is driving control that suppresses the deterioration of optical properties (mainly astigmatism, field curvature), and the first camera shake correction lens 103 and the second camera shake correction lens 113 are driven in synchronization. On the other hand, the second control mode is a driving control that prioritizes camera shake correction performance, and the first camera shake correction lens 103 and the second camera shake correction lens 113 are driven without being in synchronization. In this way, in the first control mode, the second camera shake correction lens 113 is driven so as to suppress the eccentric aberration that occurs due to driving the first camera shake correction lens 103. Accordingly, compared to the case in which only the first camera shake correction lens 103 is driven, astigmatism and field curvature aberration can be suppressed.

However, in the first control mode, there are cases in which correction of all five of Seidel's aberrations (1 lens distortion, 2 spherical aberration, 3 comatic aberration, 4 astigmatism, and 5 field curvature) is more difficult than in the case where only the first camera shake correction lens is driven without driving the second camera shake correction lens 113.

Thus in the present embodiment, in the first control mode, astigmatism and field curvature are prioritized, and correction is performed by driving the second camera shake correction lens 113 so as to suppress the eccentric aberration that occurs due to driving the first camera shake correction lens 103, more than the case in which only the first camera shake correction lens is driven without driving the second camera shake correction lens 113.

The following is a description of the correspondence between the image shooting conditions and the first control mode and the second control mode.

Focal Length

The first control mode is used in an area in which the focal length is smaller than a predetermined threshold value, and a second control mode is used in an area in which the focal length is greater than or equal to the threshold value. That is to say, the focal length being at or higher than the threshold value is a predetermined condition in the present embodiment. This is because variation in the angle of view due to hand shake is small in an area in which the focal length is short in general, and the influence on the variation in the angle of view due to hand shake is large in an area in which the focal length is long. In an area in which the focal length is short, the cut off frequencies of the LPF 503 and the HPF 504 are set low compared an area in which the focal length is long. Accordingly, the frequency band of the position of the first camera shake correction lens 103 that is extracted by the HPF 504 becomes wider, and the second camera shake correction lens 113 is driven in synchronization with the position of the first camera shake correction lens 103. On the other hand, in a range in which the focal length is long, by setting the cut off frequencies of the LPF 503 and the HPF 504 to a high frequency, the second camera shake correction lens 113 is not synchronized with the first camera shake correction lens 103, and is independently driven according to the hand shake angle signal.

Amount of Camera Shake

Because the effect of camera shake correction does not need to be high in the case in which the amount of camera shake detected by the vibration sensor is smaller than the predetermined threshold value, driving is performed in first control mode, and in the case of it being at or higher than the threshold value, driving is performed in the second control mode. That is to say, the amount of camera shake being at or higher than the threshold value is a predetermined condition in the present embodiment. For example, in the case in which the amount of camera shake is large when shooting while walking, by setting the cut off frequencies of the LPF 503 and the HPF 504 to a high frequency, the second camera shake correction lens 113 is not synchronized with the first camera shake correction lens 103, and the lenses are driven separately according to the hand shake angle signal. At this time, the polarities of the gain used in the multiplication in the first drive gain processing unit 502, which determines the driving amount and direction of the first camera shake correction lens 103, and the gain in the second drive gain processing unit 505, which determines the driving amount and direction of the second camera shake correction lens 113, are changed in accordance with the power characteristics of the two camera shake correction lenses. Accordingly, by the two camera shake correction lenses performing camera shake correction on the same image shake angle signal, the amount of driving of the camera shake correction lenses relative to camera shake can be suppressed compared to a case in which only one camera shake correction lens is driven. For this reason, there is ample room before the driving limit is reached, and even larger camera shake can be corrected.

For example, as shown in FIG. 10A, in the case of configuration with the first camera shake correction lens 103 that has a positive power, and the second camera shake correction lens 113 that has a negative power, the directions of change in the angle of view of the captured image in the case in which the camera shake correction lenses are driven in the same direction are reversed. For this reason, the gains that are multiplied by the first drive gain processing unit 502 and the second drive gain processing unit 505 are set to opposite polarities so that the first camera shake correction lens 103 and the second camera shake correction lens 113 are driven in opposite directions with respect to the camera shake correction signal.

Change in Image Shooting Direction

Driving is performed in the first control mode in a still state such as when a photographer is steadily holding the image capturing apparatus and capturing a fixed point, and driving is performed in the second control mode in cases in which the image shooting direction is intentionally changed for framing such as panning or tilting operations. That is to say, the change in the image capturing direction being at or higher than a threshold value is the predetermined condition in the present embodiment. When driving the first camera shake correction lens 103 and the second camera shake correction lens 113 in synchronization by the first control mode during a panning operation, the two lenses are both easily driven to a camera shake correction limit position. For this reason, extreme reduction in camera shake correction performance immediately after framing is avoided by performing drive control in the second control mode. If panning is detected, the second control is set, and the cut off frequencies of the LPF 503 and the HPF 504 are set high compared to when in a still state. Accordingly, the camera shake correction lenses can be independently driven according to the image shake angle signal without the second camera shake correction lens 113 being synchronized with the first camera shake correction lens 103. Also, a configuration is possible in which the gain of the second drive gain processing unit 505 is set low, and the second camera shake correction lens 113 is controlled so as to easily return to the driving center.

Shooting Mode

During shooting of moving images, driving is performed in the first control mode, and when capturing a still image, driving is performed in the first control mode or the second control mode in accordance with other image shooting condition. Captured images are constantly recorded in the moving image shooting mode, and therefore this is for avoiding the occasional deterioration of optical properties and obtaining of visually unpleasant captured images due to synchronization deviation between the first camera shake correction lens 103 and the second camera shake correction lens 113.

Still Image Shooting State

The image capturing apparatus is driven in the first control mode during shooting stand-by in still image capturing, and driven in the second control mode during exposure. In other words, exposure being performed when shooting still images is the predetermined condition in the present embodiment. When the first camera shake correction lens 103 and the second camera shake correction lens 113 are driven in synchronization, both of the lenses reach the control limit when the camera shake is large, and there is an issue in which a sufficient camera shake correction effect cannot be obtained during exposure. In view of this, during shooting stand-by, setting the cut off frequency slightly high compared to the cut off frequency of the LPF 503 and the HPF 504 when performing moving image shooting makes it harder for the second camera shake correction lens 113 to reach the driving limit. Also, by setting the cut off frequencies of the LPF 503 and the HPF 504 when exposure starts further higher than during shooting stand-by, ample room before the driving limit of the second camera shake correction lens 113 can be ensured, and decrease in the shake correction effect during exposure can be avoided.

Shake Correction Mode

By performing driving in the first control mode while the shake correction has stopped, it is possible to avoid deterioration in optical properties caused by misalignment of the positions of the two lenses due to a disturbance to the image capturing apparatus such as vibration or an impact.

State of First Camera Shake Correction Lens

When the second camera shake correction lens 113 is driven in synchronization with the position of the first camera shake correction lens 103, in the case in which the first camera shake correction lens 103 malfunctions and cannot be driven due to some sort of issue, the second camera shake correction lens 113 that can be driven normally also stops being able to be driven. Accordingly, in the case in which the first camera shake correction lens 103 malfunctions, the cut off frequencies of the LPF 503 and the HPF 504 are set high, and driving is performed in the second control mode, and therefore camera shake correction control can be continued using the second camera shake correction lens 113 even if the first camera shake correction lens 103 malfunctions. For this reason, an extreme decrease in the effect of shake correction can be avoided.

Note that by giving a priority order to the image shooting conditions shown in FIG. 9, the first control mode or the second control mode can be set based on the image shooting conditions that has the highest priority. Also, the control mode may be set to the most often selected mode between the first control mode and the second control mode as the result of determinations made regarding multiple image shooting conditions, and the condition for ultimately choosing between the first control mode and the second control mode need only be suitably changed.

According to the above-described embodiment, synchronized driving of the first camera shake correction lens 103 and the second camera shake correction lens 113 is performed by either changing the cut off frequencies of the LPF 503 and the HPF 504 or changing the gain of the second drive gain processing unit 505 in accordance with the image shooting conditions. Accordingly, an image stabilization apparatus can be provided in which a setting for synchronized driving or non-synchronized driving can be made in accordance with an image shooting condition, and both optical properties and camera shake correction performance are achieved.

Note that in the present embodiment, a correction lens is used for the correction optical system, but image stability on the image sensing surface can be ensured even by driving image sensing units such as CCDs relative to the imaging optical system. In other words, the image sensing unit may be used as a mechanism for stabilizing camera shake. Also, the CCD driving and the stabilization optical system may be used in combination.

Variations

In the above-described embodiment, the case is described in which the first control mode and the second control mode are switched by setting the cut off frequencies of the LPF 503 and the HPF 504 predetermined frequencies in accordance with the image shooting condition. In contrast, it is possible to change the independence of the control of the LPF 503 and the HPF 504 in a continuous manner by changing the cut off frequencies of the LPF 503 and the HPF 504 to predetermined values in a continuous manner.

For example, the cut off frequencies of the LPF 503 and the HPF 504 may be raised higher in small increments as an area in which the focal length is long is approached. In doing this, the hand shake frequency band included in the position of the first camera shake correction lens 103 extracted by the HPF 504 becomes narrow, and conversely the ratio of the hand shake frequency band in the hand shake angle signal extracted by the LPF 503 becomes broader. In this way, the influence that the position of the first camera shake correction lens 103 has on control of the second camera shake correction lens 113 can be changed gradually.

The above is a description of preferable embodiments of the present invention, but the present invention is not limited to these embodiments, and materials, shapes, dimensions, modes, numbers, and arrangement places can be modified and changed in various ways within the scope of the gist of the invention. For example, in the case of using three or more correction lenses, or also in the case of combining the driving of the image sensing devices with multiple correction lenses, the first control mode for synchronized driving and the second control mode for non-synchronized control can be applied, and control for changing the degree of independence can be possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-166998, filed on Aug. 19, 2014, and 2015-102276, filed on May 19, 2015 which are hereby incorporated by reference herein in their entirety.

What is claimed is:

1. An image stabilization apparatus comprising:
a first optical correction unit;
a second optical correction unit that is arranged at a position different from the first optical correction unit in an optical axis direction;
a control unit configured to execute a first control mode in which a shake is optically corrected by moving the first optical correction unit in a direction that is different from an optical axis based on a shake correction signal calculated from output from a shake detection unit, and in which the second optical correction unit is moved in a direction different from the optical axis using position information of the first optical correction unit after being moved, and a second control mode in which a shake is optically corrected by moving, based on the shake correction signal, the first optical correction unit and the second optical correction unit in a direction that is different from the optical axis, the second optical correction unit being moved without using position information of the first optical correction unit after being moved; and
an obtaining unit configured to obtain an image shooting condition;
wherein in accordance with the image shooting condition, the control unit switches between the first control mode and the second control mode.

2. The image stabilization apparatus according to claim 1, wherein the obtaining unit further obtains a shake signal output from the shake detection unit, and the control unit executes the first control mode in a case in which a magnitude of the shake signal is smaller than a predetermined threshold value, and executes the second control mode in a case in which the magnitude of the shake signal is greater than or equal to the threshold value.

3. The image stabilization apparatus according to claim 1, wherein the obtaining unit further obtains information indicating a focal length, and the control unit executes the first control mode in a case in which the focal length is smaller than a predetermined threshold value, and executes the second control mode in a case in which the focal length is greater than or equal to the threshold value.

4. The image stabilization apparatus according to claim 1, wherein the obtaining unit further makes a determination regarding panning, and the control unit executes the second control mode in a case in which the determination unit determines that a panning operation is being performed.

5. The image stabilization apparatus according to claim 1, wherein the control unit executes the first control mode in a case of moving image shooting, and executes the second control mode in a case of still image shooting.

6. The image stabilization apparatus according to claim 1, wherein the control unit executes the first control mode in a case of stand-by in still image shooting, and executes the second control mode in a case of exposure in the still image shooting.

7. The image stabilization apparatus according to claim 1, wherein in a case in which a power of the first optical correction unit and a power of the second optical correction unit have different positive/negative signs, in the first control mode, the control unit moves the first optical correction unit and the second optical correction unit in the same direction, and in a case in which the power of the first optical correction unit and the power of the second optical correction unit have the same positive/negative sign, in the first control mode, the control unit moves the first optical correction unit and the second optical correction unit in mutually different directions.

8. The image stabilization apparatus according to claim 1, further comprising a position detection unit that detects a position of the first optical correction unit and outputs position information, wherein the control unit includes a low pass filter unit that extracts a low-frequency component and a high pass filter unit that extracts a high-frequency component, and a low-frequency component is extracted by the low pass filter unit from one of a shake correction signal output from the shake detection unit and the position information, a high-frequency component is extracted by the high pass filter unit from the other of the shake correction signal and the position information, and the control unit controls the second optical correction unit based on a signal obtained by combining the extracted low-frequency component and the extracted high-frequency component.

9. An image stabilization apparatus comprising:

a first optical correction unit configured to optically correct a shake by being moved in a direction that is different from an optical axis based on a shake correction signal calculated from output from a shake detection unit;

a second optical correction unit configured to optically correct a shake by being moved in a direction that is different from the optical axis based on the shake correction signal;

a control unit configured to execute a first control mode or a second control mode; and an obtaining unit configured to obtain an image shooting condition, wherein in the first control mode, the control unit moves the first optical correction unit and the second optical correction unit with the same frequency and the same phase, and moves the second optical correction unit using position information of the first optical correction unit after being moved, wherein in the second control mode, the control unit moves the first optical correction unit and the second optical correction unit with mutually different frequencies and phases, the second optical correction unit being moved without using position information of the first optical correction unit after being moved, and wherein in accordance with the image shooting condition, the control unit switches between the first control mode and the second control mode.

10. The image stabilization apparatus according to claim 9, wherein the obtaining unit further obtains a shake signal output from the shake detection unit, and the control unit executes the first control mode in a case in which a magnitude of the shake signal is smaller than a predetermined threshold value, and executes the second control mode in a case in which the magnitude of the shake signal is greater than or equal to the threshold value.

11. The image stabilization apparatus according to claim 9, wherein the obtaining unit further obtains information indicating a focal length, and the control unit executes the first control mode in a case in which the focal length is smaller than a predetermined threshold value, and executes the second control mode in a case in which the focal length is greater than or equal to the threshold value.

12. The image stabilization apparatus according to claim 9, wherein the obtaining unit further makes a determination regarding panning, and the control unit executes the second control mode in a case in which the determination unit determines that a panning operation is being performed.

13. The image stabilization apparatus according to claim 9, wherein the control unit executes the first control mode in a case of moving image shooting, and executes the second control mode in a case of still image shooting.

14. The image stabilization apparatus according to claim 9, wherein the control unit executes the first control mode in a case of stand-by in still image shooting, and executes the second control mode in a case of exposure in the still image shooting.

15. The image stabilization apparatus according to claim 9, wherein in a case in which a power of the first optical correction unit and a power of the second optical correction unit have different positive/negative signs, in the first control mode, the control unit moves the first optical correction unit and the second optical correction unit in the same direction, and in a case in which the power of the first optical correction unit and the power of the second optical correction unit have the same positive/negative sign, in the first control mode, the control unit moves the first optical correction unit and the second optical correction unit in mutually different directions.

16. The image stabilization apparatus according to claim 9, further comprising a position detection unit that detects a position of the first optical correction unit and outputs position information, wherein the control unit includes a low pass filter unit that extracts a low-frequency component and a high pass filter unit that extracts a high-frequency component, and a low-frequency component is extracted by the low pass filter unit from one of a shake correction signal output from the shake detection unit and the position information, a high-frequency component is extracted by the high pass filter unit from the other of the shake correction signal and the position information, and the control unit controls the second optical correction unit based on a signal obtained by combining the extracted low-frequency component and the extracted high-frequency component.

17. A method of controlling an image stabilization apparatus that has a first optical correction unit and a second optical correction unit arranged at a position different from the first optical correction unit in an optical axis direction of the first optical correction unit, the method comprising:

obtaining an image shooting condition; and executing a first control mode or a second control mode, and switching between the first control mode and the second control mode, in accordance with the image shooting condition, wherein in the first control mode, optically correcting a shake by moving the first optical correction unit in a direction different from an optical axis based on a shake correction signal calculated from output from a shake detection unit; and moving the second optical correction unit in a direction different from the optical axis using position information of the first optical correction unit after being moved, and wherein in the second control mode, optically correcting a shake by moving, based on the shake correction signal, the first optical correction unit and the second optical correction unit in a direction that is different from the optical axis, the second optical correction unit being moved without using position information of the first optical correction unit after being moved.

18. A method of controlling an image stabilization apparatus that has a first optical correction unit configured to optically correct a shake by being moved in a direction that is different from an optical axis based on a shake correction signal calculated from output from a shake detection unit and a second optical correction unit configured to optically correct a shake by being moved in a direction that is different from the optical axis based on the shake correction signal, the method comprising:

obtaining an image shooting condition; and executing a first control mode or a second control mode, and switching between the first control mode and the second control mode, in accordance with the image shooting condition, wherein in the first control mode, the first optical correction unit and the second optical correction unit are moved with the same frequency and the same phase using position information of the first optical correction unit after being moved, and wherein in the second control mode, the first optical correction unit and the second optical correction unit are moved with mutually different phases and frequencies, the second optical correction unit being moved without using position information of the first optical correction unit after being moved.

* * * * *